(12) United States Patent
Zhong et al.

(10) Patent No.: US 12,488,521 B2
(45) Date of Patent: Dec. 2, 2025

(54) FORCE-DIRECTED GRAPH LAYOUT METHOD AND APPARATUS, ELECTRONIC DEVICE, AND STORAGE MEDIUM

(71) Applicant: Beijing Volcano Engine Technology Co., Ltd., Beijing (CN)

(72) Inventors: Fahai Zhong, Beijing (CN); Yilin Qiu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/963,236

(22) Filed: Nov. 27, 2024

(65) Prior Publication Data
US 2025/0182353 A1   Jun. 5, 2025

(30) Foreign Application Priority Data
Nov. 30, 2023 (CN) .......................... 202311623340.5

(51) Int. Cl.
*G06T 11/20*   (2006.01)
(52) U.S. Cl.
CPC ........ *G06T 11/206* (2013.01); *G06T 2210/21* (2013.01)
(58) Field of Classification Search
CPC . G06T 11/206; G06T 2210/21; G06F 16/904; G06F 16/9024
See application file for complete search history.

(56) References Cited

U.S. PATENT DOCUMENTS

2020/0044939 A1\* 2/2020 Xia ..................... H04L 41/22
2023/0145348 A1\* 5/2023 Waddingham ...... G06F 16/9024
707/798

FOREIGN PATENT DOCUMENTS

CN           116628290 A  *  8/2023  ......... G06F 16/9024

\* cited by examiner

*Primary Examiner* — Jeffery A Brier
(74) *Attorney, Agent, or Firm* — Alleman Hall & Tuttle LLP

(57) ABSTRACT

The present invention relates to the field of data visualization technologies, and discloses a force-directed graph layout method and apparatus, an electronic device, and a storage medium. The force-directed graph layout method of the present invention includes: obtaining graph data; determining initial position coordinates of nodes in the node groups, and constructing an initial force-directed layout graph of the graph data; determining, based on the initial position coordinates of the nodes, an intra-group force and an inter-group force on each node, where the intra-group force corresponds to a node group to which the node belongs, and the inter-group force corresponds to the node group to which the node belongs and another node group; and adjusting the initial force-directed layout graph based on the intra-group force and the inter-group force on the nodes to obtain a target force-directed layout graph.

17 Claims, 8 Drawing Sheets

FORCE-DIRECTED GRAPH LAYOUT METHOD AND APPARATUS, ELECTRONIC DEVICE, AND STORAGE MEDIUM

CROSS-REFERENCE TO RELATED APPLICATION(S)

This application claims priority to Chinese Application No. 202311623340.5 filed on Nov. 30, 2023, the disclosure of which is incorporated herein by reference in its entirety.

TECHNICAL FIELD

The present invention relates to the field of data visualization technologies, and in particular, to a force-directed graph layout method and apparatus, an electronic device, and a storage medium.

BACKGROUND

Graph data is a data type representing a relationship between entities. In the related art, to enable graph data to be presented to a user in an intuitive and understandable form, graph layout is performed on the basis of node data and edge data included in the graph data by using a force-directed layout algorithm, to obtain a force-directed layout graph that is convenient for the user to understand and analyze a relationship and a topological structure between nodes and edges in the graph data.

SUMMARY

According to a first aspect, the present invention provides a force-directed graph layout method, where the method includes:
  obtaining graph data, wherein the graph data comprises a plurality of node groups, and a node group comprises at least one node;
  determining an initial position coordinate of a node in the node group, and constructing an initial force-directed layout graph of the graph data;
  determining, based on the initial position coordinate of the node, an intra-group force and an inter-group force on the node, wherein the intra-group force corresponds to a node group to which the node belongs, and the inter-group force corresponds to the node group to which the node belongs and another node group; and
  obtaining a target force-directed layout graph by adjusting the initial force-directed layout graph based on the intra-group force and the inter-group force on the node According to a second aspect, the present invention provides a force-directed graph layout apparatus, where the apparatus includes:
  an obtaining module configured to obtain graph data, wherein the graph data comprises a plurality of node groups, and a node group comprises at least one node;
  a construction module configured to determine an initial position coordinate of a node in the node group, and constructing an initial force-directed layout graph of the graph data;
  a determination module configured to determine, based on the initial position coordinate of the node, an intra-group force and an inter-group force on the node, wherein the intra-group force corresponds to a node group to which the node belongs, and the inter-group force corresponds to the node group to which the node belongs and another node group; and
  an adjustment module configured to obtain a target force-directed layout graph by adjusting the initial force-directed layout graph based on the intra-group force and the inter-group force on the node.

According to a third aspect, the present invention provides an electronic device, including: a memory and a processor, where the memory and the processor are communicatively connected to each other, the memory stores computer instructions, and the processor performs the force-directed graph layout method according to any of the first aspect or the corresponding implementation manners thereof by executing the computer instructions.

According to a fourth aspect, the present invention provides a computer-readable storage medium, where the computer-readable storage medium stores computer instructions, and the computer instructions are configured to cause a computer to perform the force-directed graph layout method according to any of the first aspect or the corresponding implementation manners thereof.

BRIEF DESCRIPTION OF THE DRAWINGS

In order to more clearly describe specific embodiments of the present invention or technical solutions in the prior art, the following briefly describes the accompanying drawings used in describing the specific embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
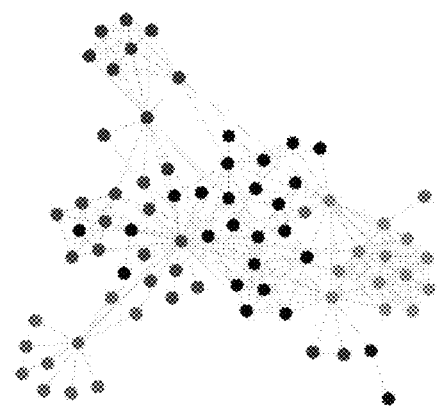
FIG. 1 is a schematic diagram of a force-directed layout graph according to the prior art.

In the related art, when a force-directed layout graph of graph data is constructed, graph layout is performed based on an interaction force between nodes, to obtain a force-directed layout graph shown in FIG. 1. To facilitate illustration, nodes in different node groups are marked in different colors.

Figure 2:
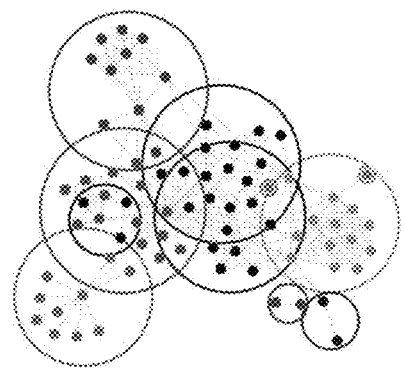
FIG. 2 is a schematic diagram of a distribution of a plurality of node groups in a force-directed layout graph according to the prior art.

However, in the force-directed layout graph constructed in this manner, although a topological structure relationship between the nodes can be clarified, a topology relationship between the node groups is relatively dispersed, and there is an overlap (as shown in FIG. 2, different circles represent different node groups), which may result in that the user cannot effectively distinguish nodes involved in each node group when performing graph data analysis by using the obtained force-directed layout graph.

In view of the above, the present invention provides a force-directed graph layout method and apparatus, an electronic device, and a storage medium, to solve the problem of unreasonable layout of a force-directed layout graph. Embodiments of the present invention provide a force-directed graph layout method, which can ensure a topological structure relationship between the node groups to be relatively more complete while ensuring a topological structure relationship between the nodes, thereby making a distribution of the obtained target force-directed layout graph more reasonable and more convenient for the user to perform targeted analysis.

In the force-directed graph layout method provided in these embodiments of the present disclosure, the initial position coordinates of the nodes in the node groups are first determined according to the plurality of node groups in the graph data, and the initial force-directed layout graph of the graph data is constructed. The intra-group force and the inter-group force on the nodes at the initial position coordinates are determined. The intra-group force corresponds to the node group to which the node belongs. That is, the intra-group force is a force on the node in the node group to which the node belongs. The inter-group force corresponds to the node group to which the node belongs and another node group. That is, the inter-group force is a force on the node in the node group to which the node belongs and from the other node group. The initial force-directed layout graph is adjusted based on the intra-group force and the inter-group force on the nodes, so that a topological structure relationship between the node groups can be ensured to be relatively more complete while a topological structure relationship between the nodes is ensured, thereby making a distribution of the obtained target force-directed layout graph more reasonable and more convenient for the user to perform targeted analysis.

According to embodiments of the present invention, embodiments of a force-directed graph layout method are provided. It should be noted that steps in the flowcharts of the accompanying drawings may be executed in a computer system such as a group of computer-executable instructions, and although a logical order is shown in the flowcharts, in some cases, the shown or described steps may be performed in an order different from that herein.

Figure 3:
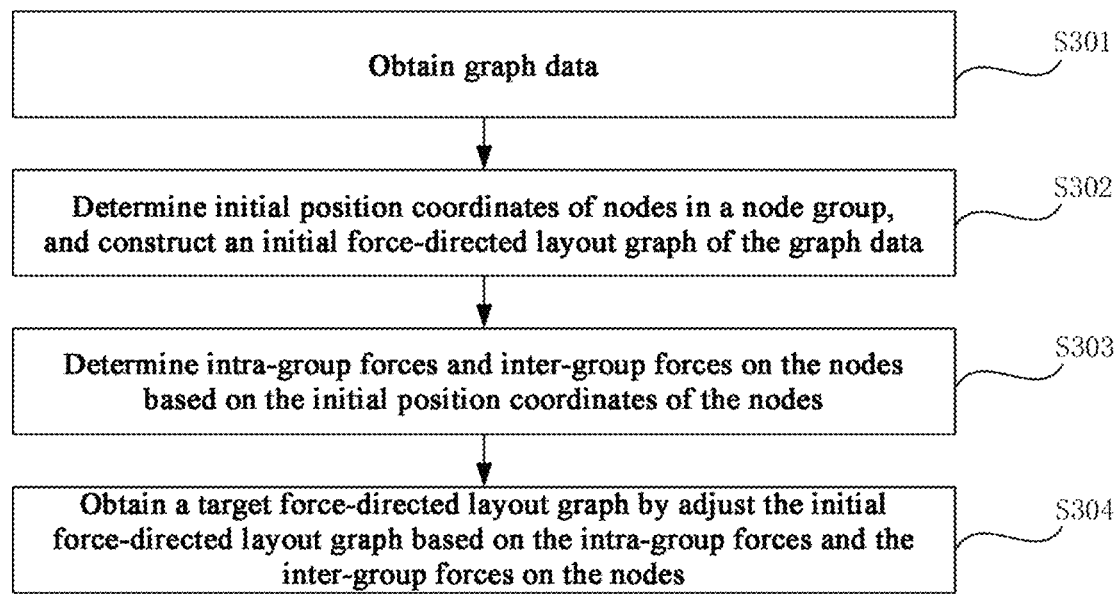
FIG. 3 is a schematic flowchart of a force-directed graph layout method according to embodiments of the present invention.

In this embodiment, a force-directed graph layout method is provided, which may be applied to an electronic device, such as a mobile phone or a tablet computer. FIG. 3 is a flowchart of the force-directed graph layout method according to embodiments of the present invention. As shown in FIG. 3, the process includes the following steps:

Step S301: Obtaining graph data.

The graph data is a data type representing a relationship between entities. The graph data includes a plurality of node groups, and each node group includes at least one node. The graph data may be obtained from a graph database or a third-party device. A manner of obtaining the graph data is not limited in the present invention, and may be set as required.

Step S302: Determining an initial position coordinate of a node in the node group, and constructing an initial force-directed layout graph of the graph data.

To facilitate visual display of a topological structure relationship between nodes in each node group in the graph data, the initial position coordinates of the nodes in each node group are first separately determined, and then the initial force-directed layout graph of the graph data is constructed according to the initial position coordinates of each node, so that a layout position of each node can be reasonably arranged while a topological structure relationship between the nodes is ensured not to be damaged.

In an example, the initial position coordinate of the node may be determined in a random allocation manner. In another example, types and attributes of each node group may be determined by using the graph data. Therefore, the initial position coordinate of the node may be determined based on attribute information of the node. For example, an initial position coordinate of one node is first determined, and then a node adjacent to the node is determined based on attribute similarity between the nodes, to obtain the initial position coordinate of each node. A higher attribute similarity indicates a shorter distance between the two nodes in initial position coordinates; and a lower attribute similarity indicates a longer distance between the two nodes in initial position coordinates.

In some optional implementation scenarios, the initial force-directed layout graph may be constructed by using any of the following layout manners: a random layout, a circular layout, a spiral layout, a Pivoted Multi-Dimensional Scaling (PivotMDS or PMDS) layout, and the like. The random layout is a layout method for randomly distributing nodes on a plane. The circular layout is a layout method for arranging nodes in a circle around a center point. The spiral layout is a layout method for arranging nodes in a spiral. The Pivot-MDS layout is a layout method based on a multi-dimensional scaling algorithm. The multi-dimensional scaling algorithm is a technology for converting high-dimensional data into low-dimensional space, and a position of each data point in the low-dimensional space may be determined in an iterative optimization manner, so that an error between a mapped distance matrix and an original distance matrix is minimized.

Preferably, when the initial force-directed layout graph of the graph data is constructed, a PivotMDS layout algorithm may be used for layout, to obtain a better global structure.

Step S303: Determining, based on the initial position coordinate of the node, an intra-group force and an inter-group force on the node.

To optimize the initial force-directed layout graph, each node is analogized to an electron, and then the intra-group force and the inter-group force on each node are separately determined based on the initial position coordinates of the nodes. The intra-group force corresponds to the node group to which the node belongs. The force on the node in the node group to which the node belongs can be determined by using the intra-group force. Then, it can be determined whether the node approaches other nodes in the same group at the initial position coordinate. The inter-group force corresponds to the node group to which the node belongs and another node group. The force on the node at the initial position coordinate and from the other node group can be determined by using the inter-group force. Then, it can be determined whether the node is away from the other node group at the initial position coordinate.

Step S304: Obtaining a target force-directed layout graph by adjusting the initial force-directed layout graph based on the intra-group force and the inter-group force on the node.

Whether a layout of each node in the initial force-directed layout graph is reasonable can be determined based on the intra-group force and the inter-group force on the nodes, for example: whether nodes in a same node group approach each other, and whether nodes in different node groups are away from each other.

To enable the obtained target force-directed layout graph to better reflect a topological connection relationship in each node group, the initial force-directed layout graph is adjusted based on the intra-group force and the inter-group force on the nodes, so that a topological structure relationship between the node groups can be ensured to be relatively more complete while a topological structure relationship between the nodes is ensured, thereby making layout positions allocated to the node groups more independent and obtaining a more reasonable target force-directed layout graph.

The force-directed graph layout method provided in these embodiments can ensure a topological structure relationship between the node groups to be relatively more complete while ensuring a topological structure relationship between the nodes, thereby making a distribution of the obtained target force-directed layout graph more reasonable and more convenient for the user to perform targeted analysis.

Figure 4:
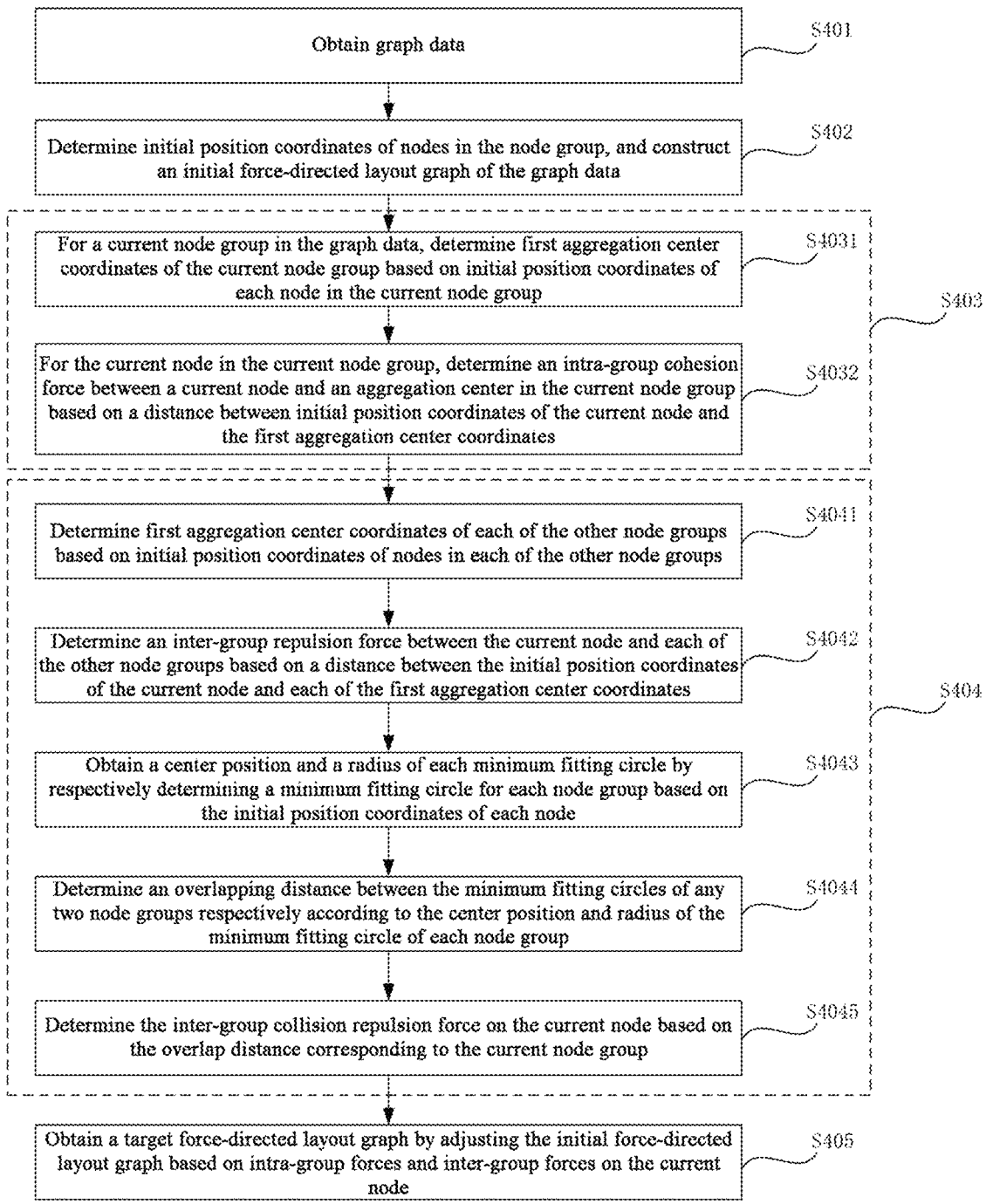
FIG. 4 is a schematic flowchart of another force-directed graph layout method according to embodiments of the present invention.

In this embodiment, a force-directed graph layout method is provided, which may be applied to the foregoing electronic device, such as a mobile phone or a tablet computer. FIG. 4 is a flowchart of the force-directed graph layout method according to embodiments of the present invention. As shown in FIG. 4, the process includes the following steps:

Step S401: Obtain graph data. For details, refer to step S301 in the embodiments shown in FIG. 3. Details are not described herein again.

Step S402: Determining an initial position coordinate of a node in the node group, and constructing an initial force-directed layout graph of the graph data. For details, refer to step S302 in the embodiments shown in FIG. 3. Details are not described herein again.

Step S403: Determining, based on the initial position coordinate of the node, an intra-group force and an inter-group force on the node.

Specifically, the foregoing step S403 includes the following steps:

Step S4031: For a current node group in the graph data, determining a first aggregation center coordinate of the current node group based on initial position coordinate of each node in the current node group.

The current node group is any of the plurality of node groups. To determine an aggregation status of the nodes in the current node group and whether the nodes approach each other, an initial center coordinate is determined based on an average value of the initial position coordinates of the nodes in the current node group. That is, a coordinate of the current node may be determined based on the initial position coordinate of the current node, then coordinates of all the nodes in the current node group are added, and the sum is divided by a number of nodes in the current node group, to obtain the initial center coordinate. A Euclidean distance between each node and the initial center coordinate is separately calculated, and then a node having a shortest distance from the initial center coordinate is used as a first aggregation center.

Step S4032: For a current node in the current node group, determining, based on a first distance between an initial position coordinate of the current node and the first aggregation center coordinate, the intra-group force on the current node within the current node group.

To detect a force on the current node in the current node group, the intra-group force on the current node in the current node group is determined by using a preset intra-group attraction force formula based on the first distance between the initial position coordinate of the current node and the first aggregation center coordinate, so that whether an initial position coordinate at which the current node is located approaches the current node group can be detected according to the obtained intra-group force. The current node is any node in the current node group.

In an example, an expression of the intra-group attraction force formula may be as follows:

$$f_a = k d_{nc} \vec{e}_{nc}$$

where $f_a$ represents the intra-group force on the current node in the current node group, k is a preset attraction parameter, $d_{nc}$ represents the first distance between the initial position coordinate of the current node and the first aggregation center coordinate, and $\vec{e}_{nc}$ represents a force direction of the intra-group force on the current node. A larger value of k indicates a stronger spring force of an edge connecting the nodes, and therefore a more stable distance between the connected nodes.

Figure 5:
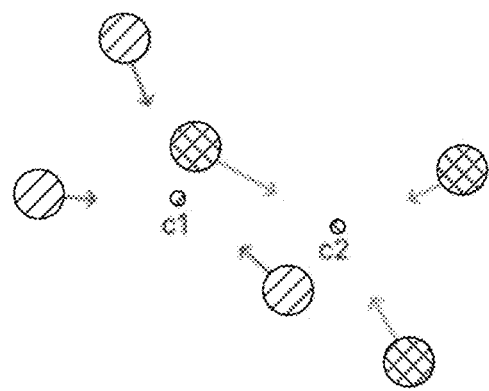
FIG. 5 is a schematic diagram of a force of an intra-group attraction force according to embodiments of the present invention.

In an implementation scenario, a schematic diagram of a force of the intra-group force on the current node in the current node group may be as shown in FIG. 5. To facilitate illustration, each dot represents a different node, and nodes with the same filling shape belong to a same node group. Both $c_1$ and $c_2$ are first aggregation center coordinates of different node groups. Taking a node group in which $c_1$ is located as an example, a direction from each node in the node group at the initial position coordinate to $c_1$ is a force direction $\vec{e}_{nc}$ of the intra-group force on the node in the node group.

Step S404: Determine an inter-group force on the node based on the initial position coordinate of the node.

Specifically, the inter-group force comprises an inter-group repulsion force, and the foregoing step S404 includes the following steps:

Step S4041: Determining a second aggregation center coordinate of each other node group based on an initial position coordinate of each node in the other node group.

To facilitate determining the inter-group repulsion force on the current node, the second aggregation center coordinate of each of the other node groups is separately determined. A principle of determining the second aggregation center coordinate is the same as that of determining the first aggregation center coordinate, and details are not described herein again.

Step S4042: Determining the inter-group repulsion force on the current node based on a second distance between the initial position coordinate of the current node and each second aggregation center coordinate.

To detect an impact of the other node group on the current node, the inter-group repulsion force on the current node is determined by using a preset inter-group repulsion force formula based on the second distance between the initial position coordinate of the current node and each of the second aggregation center coordinates. That is, the inter-group repulsion force applied by each of the other node groups to the current node is separately determined, so that whether an initial position coordinate at which the current node is located is away from each of the other node groups can be detected according to the obtained inter-group repulsion force.

In an example, an expression of the inter-group repulsion force formula may be as follows:

$$f_r = \frac{k'}{d_{nc}} \vec{e_{nc}}$$

where $f_r$ represents the inter-group repulsion force on the current node from the current other node group, $k'$ is a preset charge intensity parameter, $d_{nc}$ represents the second distance between the initial position coordinate of the current node and the second aggregation center coordinate, and $\vec{e_{nc}}$ represents a force direction of the inter-group force on the current node. A larger value of $k'$ indicates a stronger charge force between nodes, and therefore a longer distance between charged nodes.

Figure 6:
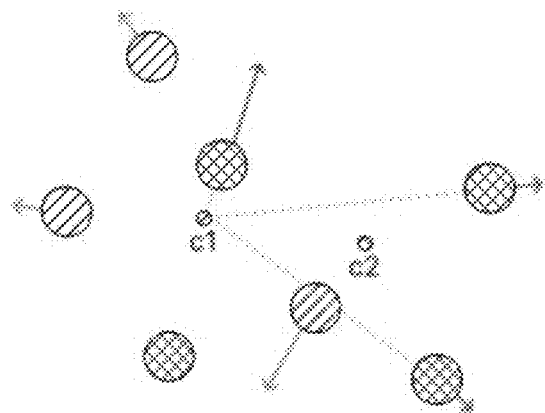
FIG. 6 is a schematic diagram of a force of an inter-group repulsion force according to embodiments of the present invention.

In an implementation scenario, a schematic diagram of a force of the inter-group repulsion force on the current node from the current other node group may be as shown in FIG. 6. To facilitate illustration, each dot represents a different node, and nodes with the same filling shape belong to a same node group. Both $c_1$ and $c_2$ are first aggregation center coordinates of different node groups. Taking a node group in which $c_1$ is located as an example, the node group is the current node group, and $c_1$ is the first aggregation center coordinate. Compared with a node group in which $c_1$ is located, a node group in which $c_2$ is located is the other node group, and $c_2$ is the second aggregation center coordinate. A direction from $c_2$ to the current node is a force direction $\vec{e_{nc}}$ of the inter-group force on the current node.

In some optional implementation manners, the inter-group force further comprises an inter-group collision repulsion force, and the foregoing step S404 further includes the following steps:

Step S4043: Determining a minimum fitting circle of each of the node groups based on the initial position coordinate of each of the nodes, respectively, to obtain a center position and a radius of each minimum fitting circle.

To optimize the initial force-directed layout graph and make layout positions in each node group relatively independent, the minimum fitting circle of the current node group is fitted by using a preset fitting algorithm based on the initial position coordinates of the nodes in the current node group. For example, the preset fitting algorithm may include any of the following algorithms: a least square method, a Random Sample Consensus (RANSAC) algorithm, a minimum enclosing circle algorithm, or a divide and conquer method. Preferably, the minimum enclosing circle algorithm may be used to determine the minimum fitting circle of the current node group, thereby helping improve determination efficiency.

After the minimum fitting circle of the current node group is determined, the center position of the minimum fitting circle is estimated based on the initial position coordinates of the nodes, to obtain the radius of the minimum fitting circle. The center position of the minimum fitting circle may be a coordinate average value of the initial position coordinates of the nodes in the current node group.

Step S4044: Determining an overlapping distance between minimum fitting circles of any two node groups based on the center position and the radius of the minimum fitting circle of each of the node groups, respectively.

To detect whether layout positions of any two node groups overlap, the overlapping distance between the minimum fitting circles of the any two node groups is determined according to the following formula:

$$\text{overlapping distance} = r_1 + r_2 - d_{c1c2}$$

where, for ease of description, the current node group and the other node group are used to represent any two node groups. $r_1$ represents the radius of the minimum fitting circle of the current node group, $r_2$ represents the radius of the minimum fitting circle of the other node group, c1 represents the center position of the minimum fitting circle of the current node group, c2 represents the center position of the minimum fitting circle of the other node group, and $d_{c1c2}$ represents a center distance between c1 and c2.

Step S4045: Determining the inter-group collision repulsion force on the current node based on the overlapping distance corresponding to the current node group.

The inter-group collision repulsion force is a force generated when layout positions of the two node groups overlap, and a smaller value of the overlapping distance indicates a smaller inter-group collision repulsion force on the current node group; and a larger value of the overlapping distance indicates a larger inter-group collision repulsion force on the current node group.

The inter-group collision repulsion force is a force for determining whether a layout position of an entire node group needs to be adjusted. Therefore, when the current node group receives the inter-group repulsion force from the other node group, a current node in the current node group also receives the inter-group collision repulsion force. Therefore, to detect whether the layout position at which the current node group is located is reasonable, it is detected, based on the overlapping distance corresponding to the current node group, whether the current node group receives the inter-group repulsion force from the other node group, to determine whether the current node receives the inter-group collision repulsion force.

In some optional implementation manners, the foregoing step S4045 includes the following steps:

Step a1: In response to an overlapping distance between a minimum fitting circle of the current node group and a minimum fitting circle of another node group being not 0, determining the inter-group collision repulsion force between the current node group and the other node group based on the overlapping distance.

Step a2: Determining a number of nodes in the current node group.

Step a3: Determining a ratio of the inter-group collision repulsion force between the current node group and the other node group to the number of nodes as the inter-group collision repulsion force on the current node.

Specifically, if the overlapping distance between the minimum fitting circle of the current node group and the minimum fitting circle of the other node group is not 0, it indicates that a layout position of the current node group overlaps a layout position of the other node group. Therefore, the inter-group collision repulsion force between the current node group and the other node group is determined by using a preset inter-group collision force formula based on the overlapping distance.

An expression of the inter-group collision force formula may be as follows:

$$f_c = (r_1 + r_2 - d_{c1c2})\overrightarrow{e_{c1c2}}$$

where $r_1$ represents the radius of the minimum fitting circle of the current node group, $r_2$ represents the radius of the minimum fitting circle of the other node group, c1 represents the center position of the minimum fitting circle of the current node group, c2 represents the center position of the minimum fitting circle of the other node group, $d_{c1c2}$ represents a center distance between c1 and c2, and $\overrightarrow{e_{c1c2}}$ is a direction from c2 to c1, representing a direction of the inter-group collision repulsion force on the current node group.

The inter-group collision repulsion force between the current node group and the other node group is an inter-group collision force on the entire current node group. Therefore, the inter-group collision repulsion force between the current node group and the other node group may be used as the inter-group collision repulsion force on the current node.

Figure 7:
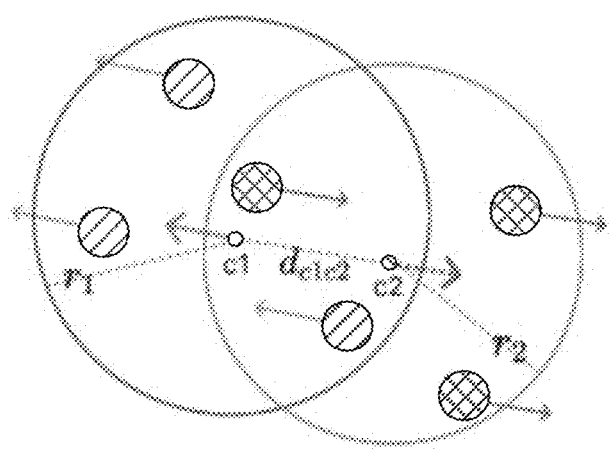
FIG. 7 is a schematic diagram of a force of an inter-group collision repulsion force according to embodiments of the present invention.

In an implementation scenario, a schematic diagram of a force of the inter-group collision repulsion force on the current node group from the other node group may be as shown in FIG. 7. c1 represents the center position of the minimum fitting circle of the current node group, c2 represents the center position of the minimum fitting circle of the other node group, $d_{c1c2}$ represents the center distance between c1 and c2, and $\overrightarrow{e_{c1c2}}$ is a direction from c2 to c1, representing the direction of the inter-group collision repulsion force on the current node group.

In some other optional implementation manners, the foregoing step S4045 further includes the following step:

Step a4: In response to an overlapping distance between a minimum fitting circle of the current node group and a minimum fitting circle of another node group being 0, determining that the inter-group collision repulsion force on the current node is 0.

If the overlapping distance between the minimum fitting circle of the current node group and the minimum fitting circle of the other node group is 0, it indicates that the layout position of the current node group does not overlap the layout position of the other node group. Therefore, the inter-group collision repulsion force is not generated between the current node group and the other node group, and it can be directly determined that the inter-group collision repulsion force on the current node is 0.

Step S405: Obtaining a target force-directed layout graph by adjusting the initial force-directed layout graph based on the intra-group force and the inter-group force on the node. For details, refer to step S304 in the embodiments shown in FIG. 3. Details are not described herein again.

The force-directed graph layout method provided in these embodiments can detect, by using the intra-group attraction force on the current node, whether the current node is separated from the current node group in which the current node is located, and detect whether a layout position of the current node group is reasonable by using the inter-group repulsion force and the inter-group collision repulsion force on the current node. Therefore, when the initial force-directed layout graph is adjusted according to the intra-group attraction force, the inter-group repulsion force, and the inter-group collision repulsion force on each node, it can be avoided that node positions in a same group are too scattered, and the layout positions of the node groups can be ensured to be relatively independent, thereby making a layout of the obtained target force-directed layout graph more reasonable and a topological structure relationship between and in the node groups clearer, and improving a user experience.

Figure 8:
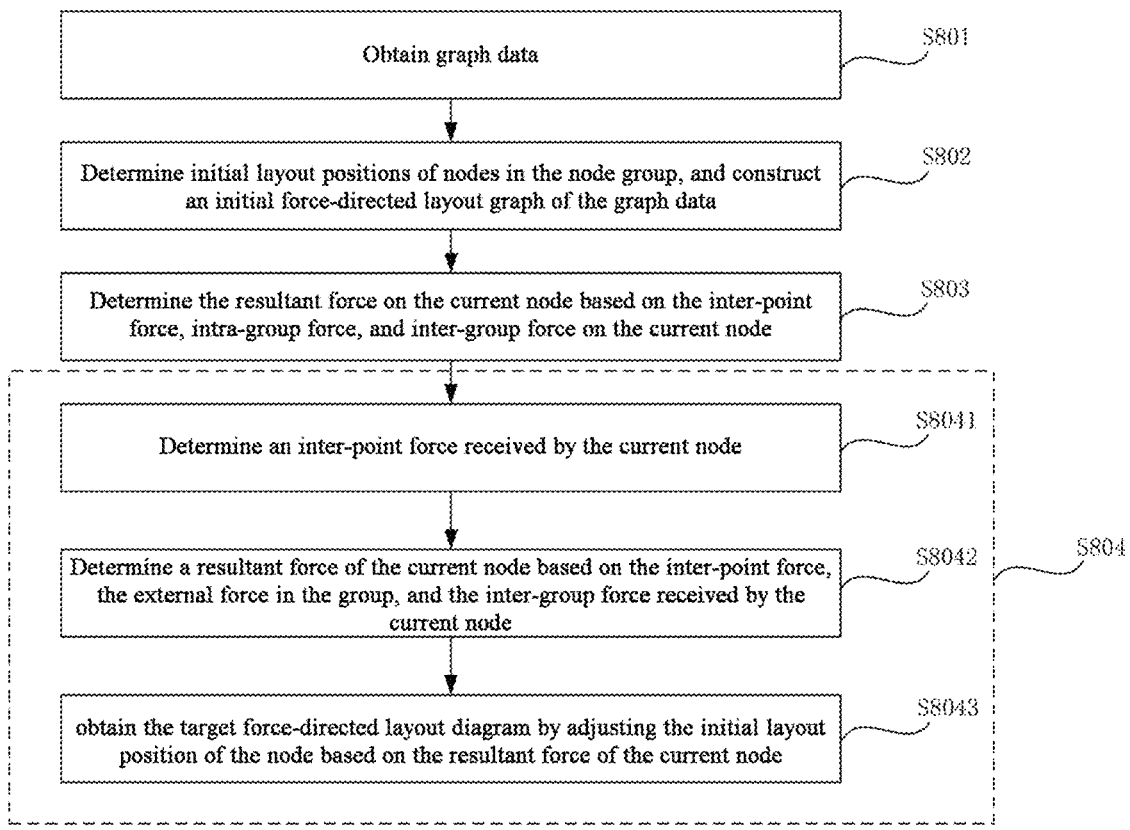
FIG. 8 is a schematic flowchart of still another force-directed graph layout method according to embodiments of the present invention.

In this embodiment, a force-directed graph layout method is provided, which may be applied to the foregoing electronic device, such as a mobile phone or a tablet computer. FIG. 8 is a flowchart of the force-directed graph layout method according to embodiments of the present invention. As shown in FIG. 8, the process includes the following steps:

Step S801: Obtaining graph data.

Step S802: Determining an initial position coordinate of a node in the node group, and constructing an initial force-directed layout graph of the graph data.

Step S803: Determining, based on the initial position coordinate of the node, an intra-group force and an inter-group force on the node.

Step S804: Obtaining a target force-directed layout graph by adjusting the initial force-directed layout graph based on the intra-group force and the inter-group force on the node.

Specifically, the foregoing step S804 includes the following steps:

Step S8041: Determining an inter-point force on the current node.

To enable each node to be clearly displayed on the target force-directed layout graph and prevent layout positions of the nodes from overlapping, the inter-point force on the current node is determined. The inter-point force includes an inter-point repulsion force and an inter-point attraction force. The inter-point repulsion force is a repulsion force on the current node from another node. The inter-point attraction force is an attraction force on the current node from another node. The other node is any node in the graph data other than the current node.

Figure 9:
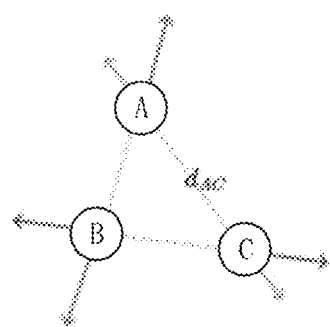
FIG. 9 is a schematic diagram of a force of an inter-point repulsion force according to embodiments of the present invention.
Figure 10:
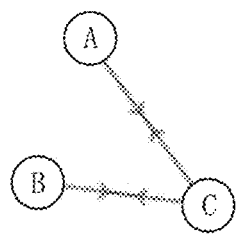
FIG. 10 is a schematic diagram of a force of an inter-point attraction force according to embodiments of the present invention.

In an implementation scenario, a schematic diagram of a force of the inter-point repulsion force on the current node may be as shown in FIG. 9, and a schematic diagram of a force of the inter-point attraction force on the current node may be as shown in FIG. 10. In FIG. 9 and FIGS. 10, A, B, and C are all nodes in the graph data.

The inter-point repulsion force on the current node may be determined by using the following formula:

$$f_{\tau AC} = \frac{\alpha}{d_{AC}} \overrightarrow{e_{AC}}$$

where $f_{\tau AC}$ represents the inter-point repulsion force on the current node in the current node group, a is a preset repulsion force parameter, $d_{AC}$ represents a distance between the initial position coordinate of the current node and an initial position coordinate of the other node, and $\overrightarrow{e_{AC}}$ represents a force direction of the inter-point repulsion force on the current node. A larger value of a indicates a stronger repulsion force of an edge connecting the nodes, and therefore a longer distance between the connected nodes.

The inter-point attraction force on the current node may be determined by using the following formula:

$$f_{aAC} = \beta d_{Ac} \overrightarrow{e_{AC}}$$

where $f_{aAc}$ represents the inter-point attraction force on the current node in the current node group, β is a preset gravitational parameter, $d_{Ac}$ represents a distance between the initial position coordinate of the current node and an initial position coordinate of the other node, and $\overrightarrow{e_{AC}}$ represents a force direction of the inter-point attraction force on the current node. A larger value of β indicates a stronger attraction force between the nodes, and therefore a shorter distance between the connected nodes.

Step S8042: Determining a resultant force on the current node based on the inter-point force, the intra-group force, and the inter-group force on the current node.

A sum of the inter-point force, the intra-group force, and the inter-group force on the current node is determined as the resultant force on the current node. For example, if there are n node groups and m nodes in the graph data, a sum of (m−1) inter-point repulsion forces, (m−1) inter-point attraction forces, the intra-group force, (n−1) inter-group repulsion forces, and (n−1) inter-group collision repulsion forces received by the current node is used as the resultant force on the current node. n is an integer greater than 0, and m is an integer greater than 0.

The inter-point force, the intra-group force, and the inter-group force are all vectors. Therefore, a force status of the current node can be determined by using the resultant force of the current node. That is, a force intensity of the current node can be determined by using a magnitude of the resultant force, and a force direction of the current node can be determined by using a direction of the resultant force.

Step S8043: Obtaining a target force-directed layout graph by adjusting the initial position coordinate of the node based on the resultant force of the current node.

To enable the obtained target force-directed layout graph to better express a topological structure relationship between the nodes and a topological structure relationship between the node groups, the initial position coordinate of the current node is adjusted based on the resultant force of the current node, and an iterative adjustment manner is used to gradually determine an optimal layout position of the current node, to obtain the target force-directed layout graph.

A displacement of the current node may be determined in the following manner:

If an initial layout coordinate of the current node A is (x_A,y_A) and a resultant force on the current node A is F=(x,y), an intermediate layout position of the current node is ((x_A+c*x,y_A+c*y). Where x_A represents a layout position component of the initial position coordinate of the current node A in a horizontal direction, y_A represents a layout position component of the initial position coordinate of the current node A in a vertical direction, x represents a component force on the current node A in the horizontal direction, y represents a component force on the current node A in the vertical direction, and c is a temperature parameter, and is used to determine a moving step of the current node A.

Figure 11:
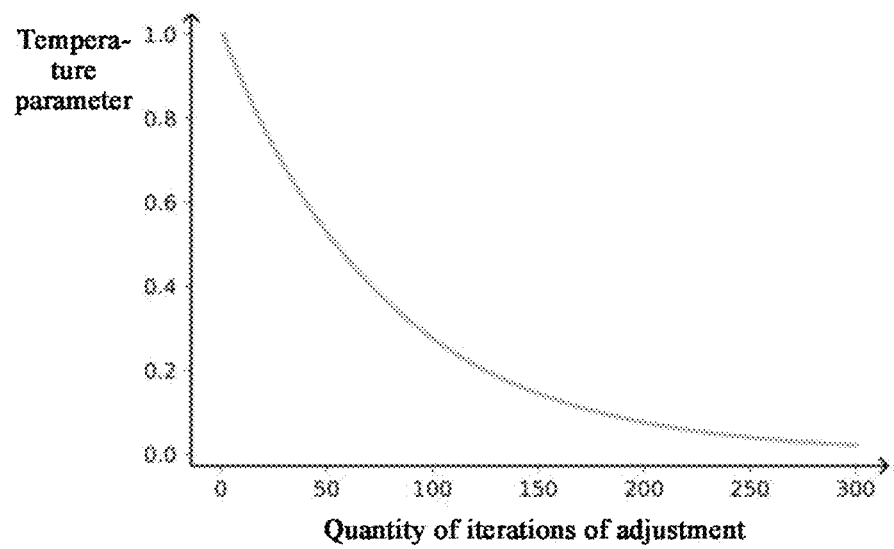
FIG. 11 is a schematic diagram of attenuation of a temperature parameter according to embodiments of the present invention.

A value of the temperature parameter depends on a quantity of iterations of the current node A. For an (i+1)th iteration, an expression of the temperature parameter is as follows:

$$c_{i+1} = c_i + (c\text{Min} - c_i) * c\text{Decay}$$

$$c_0 = 1$$

where cDecay is a decay coefficient, and cMin is a target minimum value of the temperature parameter. That is, the temperature parameter is a decay function, and gradually decays as the quantity of current iterations increases. A schematic diagram of attenuation of the temperature parameter according to the quantity of iterations may be as shown in FIG. 11. The abscissa represents the quantity of iterations, and the ordinate represents a value of c.

Therefore, the temperature parameter is determined by using the foregoing formula, and in an early stage of the iteration, the layout position of the current node A is changed in a large-scale movement manner, so that the current node A can be quickly moved to a proper layout position. In a later stage of the iteration, the proper layout position of the current node A is finely adjusted in a small-scale movement manner, to determine the optimal layout position, to avoid over adjustment.

In an example, if an average moving distance of all the nodes in the graph data is less than a preset threshold, it indicates that layout positions of the nodes and layout positions of the node groups are all converged, and no further adjustment is required, to obtain the target force-directed layout graph, thereby saving a calculation cost.

In another example, a preset iteration adjustment threshold is set. When a quantity of iterations of adjusting the initial position coordinate of the current node reaches the iteration adjustment threshold, adjustment to the initial force-directed layout graph is ended, and the force-directed layout graph obtained after this adjustment is used as the target force-directed layout graph.

The force-directed graph layout method provided in these embodiments can ensure that a topological structure between the nodes is clear, and can further ensure that groups with more connections are close to each other and groups with fewer connections are far away from each other between different groups. A topological structure between the groups is fully ensured to be clear, and layout spaces of the different groups are independent and do not overlap each other.

Figure 12:
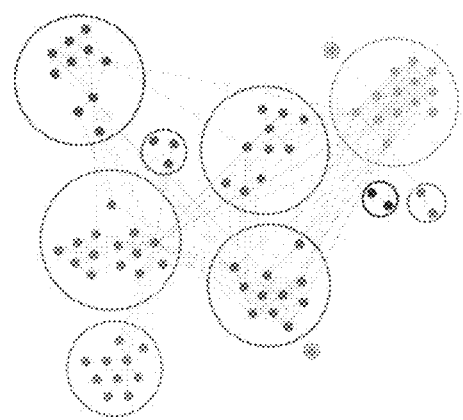
FIG. 12 is a schematic diagram of a distribution of a plurality of node groups in a force-directed layout graph according to embodiments of the present invention.

In an optional implementation scenario, the initial force-directed layout graph shown in FIG. 1 is laid out by using the force-directed graph layout method provided in the present disclosure, to obtain the target force-directed layout graph shown in FIG. 12.

Figure 13:
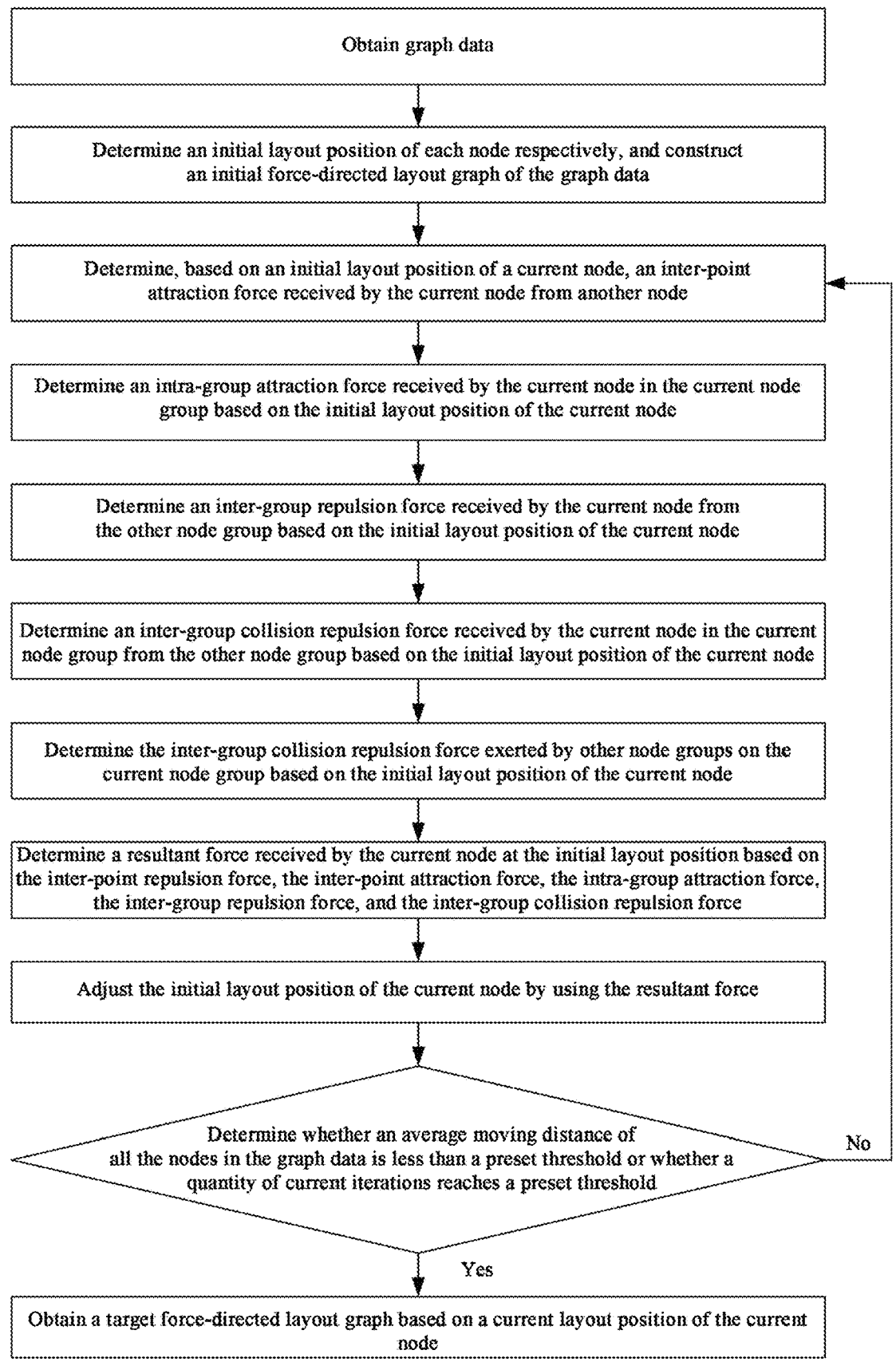
FIG. 13 is a schematic flowchart of yet another force-directed graph layout method according to embodiments of the present invention.

In an optional implementation scenario, as shown in FIG. 13, the force-directed graph layout method includes the following processes:

Obtaining graph data, where the graph data includes a plurality of node groups, and each node group includes at least one node.

Determining an initial position coordinate of each node, and constructing an initial force-directed layout graph of the graph data, respectively.

Determining, based on an initial position coordinate of a current node, an inter-point repulsion force on the current node from another node.

Determining, based on an initial position coordinate of a current node, an inter-point attraction force on the current node from another node.

Determining an intra-group attraction force on the current node in the current node group based on the initial position coordinate of the current node.

Determining an inter-group repulsion force on the current node from the other node group based on the initial position coordinate of the current node.

Determining an inter-group collision repulsion force on the current node in the current node group from the other node group based on the initial position coordinate of the current node.

Determining a resultant force on the current node at the initial position coordinate based on the inter-point repulsion force, the inter-point attraction force, the intra-group attraction force, the inter-group repulsion force, and the inter-group collision repulsion force.

Adjusting the initial position coordinate of the current node by using the resultant force.

Determine whether an average moving distance of all the nodes in the graph data is less than a preset threshold or whether a quantity of current iterations reaches an iteration adjustment threshold. If yes, obtain a target force-directed layout graph based on a current layout position of the current node. If no, repeat the foregoing steps until the average moving distance of all the nodes in the graph data is less than the preset threshold or the quantity of current iterations reaches the iteration adjustment threshold.

For case of description, except for an initial iteration round, an initial position coordinate of a node obtained after adjustment in a previous iteration round is used as an initial position coordinate of a current iteration round for any other iteration round, and a target force-directed layout graph obtained in the previous iteration round is used as an initial force-directed layout graph of the current iteration round.

Embodiments of the present invention further provide a force-directed graph layout apparatus. The apparatus is configured to implement the foregoing embodiments and preferred implementation manners, and details of descriptions that have been provided are not repeated. As used hereinafter, the term "module" may be a combination of software and/or hardware that implements a predetermined function. Although the apparatus described in the following embodiments is preferably implemented in software, implementation in the form of hardware, or a combination of software and hardware, is also possible and contemplated.

Figure 14:
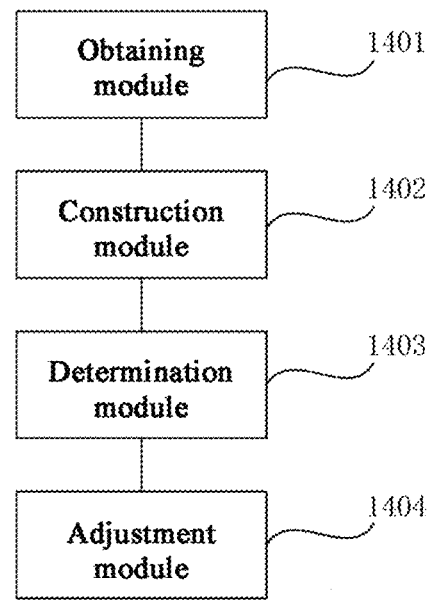
FIG. 14 is a block diagram of a structure of a force-directed graph layout apparatus according to embodiments of the present invention.

These embodiments provide a force-directed graph layout apparatus. As shown in FIG. 14, the apparatus includes:

an obtaining module 1401, configured to obtain graph data, wherein the graph data comprises a plurality of node groups, and a node group comprises at least one node;

a construction module 1032, configured to determine an initial position coordinate of a node in the node group, and construct an initial force-directed layout graph of the graph data;

a determination module 1403, configured to determine, based on the initial position coordinate of the node, an intra-group force and an inter-group force on the node, wherein the intra-group force corresponds to a node group to which the node belongs, and the inter-group force corresponds to the node group to which the node belongs and another node group; and an adjustment module 1404, configured to obtain a target force-directed layout graph by adjusting the initial force-directed layout graph based on the intra-group force and the inter-group force on the node.

In some optional implementation manners, the determination module 1403 includes: a first processing unit, configured to, for a current node group in the graph data, determine a first aggregation center coordinate of the current node group based on initial position coordinate of each node in the current node group; and a second processing unit, configured to, for a current node in the current node group, determining, based on a first distance between an initial position coordinate of the current node and the first aggregation center coordinate, the intra-group force on the current node within the current node group.

In some optional implementation manners, the inter-group force comprises an inter-group repulsion force, and the determination module 1403 further includes: a third processing unit, configured to determine a second aggregation center coordinate of each other node group based on an initial position coordinate of each node in the other node group; and a fourth processing unit, configured to determine the inter-group repulsion force on the current node based on a second distance between the initial position coordinate of the current node and each second aggregation center coordinate.

In some optional implementation manners, the inter-group force further comprises an inter-group collision repulsion force; and the determination module 1403 further includes: a fifth processing unit, configured to determine a minimum fitting circle of each of the node groups based on the initial position coordinate of each of the nodes, respectively, to obtain a center position and a radius of each minimum fitting circle; a sixth processing unit, configured to determine an overlapping distance between minimum fitting circles of any two node groups based on the center position and the radius of the minimum fitting circle of each of the node groups, respectively; and a seventh processing unit, configured to determine the inter-group collision repulsion force on the current node based on the overlapping distance corresponding to the current node group.

In some optional implementation manners, the seventh processing unit includes: a first execution unit, configured to, in response to an overlapping distance between a minimum fitting circle of the current node group and a minimum fitting circle of another node group being not 0, determine the inter-group collision repulsion force between the current node group and the other node group based on the overlapping distance, and determine the inter-group collision repulsion force between the current node group and the other node group as the inter-group collision repulsion force on the current node.

In some optional implementation manners, the seventh processing unit further includes: a second execution unit, configured to, in response to an overlapping distance between a minimum fitting circle of the current node group and a minimum fitting circle of another node group being 0, determine that the inter-group collision repulsion force on the current node is 0.

In some optional implementation manners, the adjustment module 1404 includes: an eighth processing unit, configured to determine an inter-point force on the current node; an integration unit, configured to determine a resultant force on the current node based on the inter-point force, the intra-group force, and the inter-group force on the current node; and a position adjustment unit, configured to obtain the target force-directed layout graph by adjusting the initial position coordinate of the node based on the resultant force of the current node.

Further function descriptions of the foregoing modules and units are the same as those of the corresponding embodiments. Details are not described herein again.

The force-directed graph layout apparatus in these embodiments is presented in a form of a functional unit. The unit herein refers to an ASIC (Application Specific Integrated Circuit) circuit, a processor that executes one or more software or firmware programs, and a memory, and/or another component that may provide the foregoing functions.

Embodiments of the present invention further provide an electronic device, which includes the force-directed graph layout apparatus shown in FIG. 14.

Figure 15:
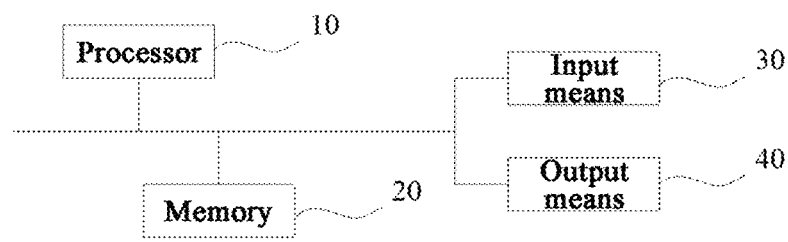
FIG. 15 is a schematic diagram of a hardware structure of an electronic device according to embodiments of the present invention.

FIG. 15 is a schematic diagram of a structure of an electronic device according to optional embodiments of the present invention. As shown in FIG. 15, the electronic device includes one or more processors 10, a memory 20, and an interface for connecting the components, including a high-speed interface and a low-speed interface. The components communicate with each other and are connected by using different buses, and may be installed on a common mainboard or otherwise installed as required. The processor may process instructions executed in the electronic device, including instructions stored in the memory or on the memory and used to display graphical information of a GUI on an external input/output means (such as a display apparatus coupled to the interface). In some optional implementation manners, if required, a plurality of processors and/or a plurality of buses may be used together with a plurality of memories and a plurality of memories. Similarly, a plurality of electronic devices may be connected, and each device provides some necessary operations (for example, as a server array, a group of blade servers, or a multi-processor system). FIG. 15 shows an example in which one processor 10 is used.

The processor 10 may be a central processing unit, a network processor, or a combination thereof. The processor 10 may further include a hardware chip. The hardware chip may be an ASIC, a programmable logic device, or a combination thereof. The programmable logic device may be a complex programmable logic device, a field programmable gate array, a general array logic, or any combination thereof.

The memory 20 stores instructions executable by at least one processor 10, so that the at least one processor 10 executes a method shown in the foregoing embodiment.

The memory 20 may include a program storage area and a data storage area. The program storage area may store an operating system, an application program required by at least one function, and the like. The data storage area may store data created based on use of the electronic device, and the like. In addition, the memory 20 may include a high-speed random access memory, and may further include a non-transitory memory, for example, at least one magnetic disk storage device, a flash memory device, or another non-transitory solid-state storage device. In some optional implementation manners, the memory 20 may alternatively include a memory remotely arranged relative to the processor 10, and the remotely arranged memory may be connected to the electronic device through a network. Examples of the network include but are not limited to the Internet, an intranet, a local area network, a mobile communication network, and a combination thereof.

The memory 20 may include a volatile memory, for example, a random access memory. The memory may alternatively include a non-volatile memory, for example, a flash memory, a hard disk, or a solid-state drive. The memory 20 may further include a combination of the foregoing types of memories.

The electronic device further includes an input means 30 and an output means 40. The processor 10, the memory 20, the input means 30, and the output means 40 may be connected through a bus or in another manner. FIG. 15 shows an example in which the components are connected through the bus.

The input means 30 may receive inputted numeric or character information, and generate a key signal input related to user setting and function control of the electronic device, for example, a touchscreen, a keypad, a mouse, a trackpad, a touchpad, an indicator pole, one or more mouse buttons, a trackball, a joystick, and the like. The output means 40 may include a display apparatus, an auxiliary lighting apparatus (for example, an LED), a tactile feedback apparatus (for example, a vibration motor), and the like. The display apparatus includes but is not limited to a liquid crystal display, a light-emitting diode display, a plasma display, and the like. In some optional implementation manners, the display apparatus may be a touchscreen.

Embodiments of the present invention further provide a computer-readable storage medium. The method according to the embodiments of the present invention may be implemented in hardware, firmware, or implemented as computer code that can be recorded in a storage medium, or originally stored in a remote storage medium or a non-transitory machine-readable storage medium and downloaded through a network and then stored in a local storage medium, so that the method described herein may be stored on such software processing in a storage medium using a general-purpose computer, a special-purpose processor, or programmable or special-purpose hardware. The storage medium may be a magnetic disk, an optical disc, a read-only memory, a random access memory, a flash memory, a hard disk, a solid-state drive, or the like. Further, the storage medium may further include a combination of the foregoing types of memories. It may be understood that a computer, a processor, a microprocessor controller, or programmable hardware includes a storage component that can store or receive software or computer code, and when the software or computer code is accessed and executed by the computer, the processor, or the hardware, the method shown in the foregoing embodiments is implemented.

Although the embodiments of the present invention are described with reference to the accompanying drawings, persons of ordinary skill in the art may make various modifications and variations without departing from the spirit and scope of the present invention. Such modifications and variations all fall within the scope defined by the appended claims.

The invention claimed is:

1. A force-directed graph layout method, comprising:
obtaining, by a computer system, graph data, wherein the graph data comprises a plurality of node groups, and a node group comprises at least one node;
determining, by the computer system, an initial position coordinate of a node in the node group, and constructing an initial force-directed layout graph of the graph data;
determining, by the computer system and based on the initial position coordinate of the node, an intra-group force and an inter-group force on the node, wherein the intra-group force corresponds to a node group to which the node belongs, and the inter-group force corresponds to the node group to which the node belongs and another node group;
obtaining, by the computer system, a target force-directed layout graph by adjusting the initial force-directed layout graph based on the intra-group force and the inter-group force on the node; and
transmitting the target force-directed layout graph to a display device for visual display,
wherein the inter-group force comprises an inter-group collision repulsion force, and determining, based on the initial position coordinate of the node, the intra-group force and the inter-group force on the node comprises:
determining a minimum fitting circle of each of the node groups based on the initial position coordinate of each of the nodes, respectively, to obtain a center position and a radius of each minimum fitting circle;
determining an overlapping distance between minimum fitting circles of any two node groups based on the center position and the radius of the minimum fitting circle of each of the node groups, respectively; and
determining the inter-group collision repulsion force on the current node based on the overlapping distance corresponding to the current node group.

2. The method according to claim 1, wherein determining, based on the initial position coordinate of the node, the intra-group force on the node comprises:
for a current node group in the graph data, determining a first aggregation center coordinate of the current node group based on initial position coordinate of each node in the current node group; and
for a current node in the current node group, determining, based on a first distance between an initial position coordinate of the current node and the first aggregation center coordinate, the intra-group force on the current node within the current node group.

3. The method according to claim 2, wherein the inter-group force comprises an inter-group repulsion force, and determining, based on the initial position coordinate of the node, the intra-group force on the node comprises:
determining a second aggregation center coordinate of each other node group based on an initial position coordinate of each node in the other node group; and
determining the inter-group repulsion force on the current node based on a second distance between the initial position coordinate of the current node and each second aggregation center coordinate.

4. The method according to claim 1, wherein the determining the inter-group collision repulsion force on the current node based on the overlapping distance corresponding to the current node group comprises:
in response to an overlapping distance between a minimum fitting circle of the current node group and a minimum fitting circle of another node group being not 0, determining the inter-group collision repulsion force between the current node group and the other node group based on the overlapping distance, and determining the inter-group collision repulsion force between the current node group and the other node group as the inter-group collision repulsion force on the current node.

5. The method according to claim 4, wherein determining the inter-group collision repulsion force on the current node based on the overlapping distance corresponding to the current node group further comprises:
in response to an overlapping distance between a minimum fitting circle of the current node group and a minimum fitting circle of another node group being 0, determining that the inter-group collision repulsion force on the current node is 0.

6. The method according to claim 1, wherein obtaining a target force-directed layout graph by adjusting the initial force-directed layout graph based on the intra-group force and the inter-group force on the node comprises:
determining an inter-point force on the current node;
determining a resultant force on the current node based on the inter-point force, the intra-group force, and the inter-group force on the current node; and
obtaining the target force-directed layout graph by adjusting the initial position coordinate of the node based on the resultant force of the current node.

7. An electronic device, comprising:
a memory and a processor, wherein the memory and the processor are communicatively connected to each other, the memory stores computer instructions, and the computer instructions, when executed by the processor, cause the electronic device to:
obtain graph data, wherein the graph data comprises a plurality of node groups, and a node group comprises at least one node;
determine an initial position coordinate of a node in the node group, and constructing an initial force-directed layout graph of the graph data;
determine, based on the initial position coordinate of the node, an intra-group force and an inter-group force on the node, wherein the intra-group force corresponds to a node group to which the node belongs, and the inter-group force corresponds to the node group to which the node belongs and another node group;
obtain a target force-directed layout graph by adjusting the initial force-directed layout graph based on the intra-group force and the inter-group force on the node; and
transmit the target force-directed layout graph to a display device for visual display,
wherein the inter-group force comprises an inter-group collision repulsion force, and the computer instructions causing the electronic device to determine, based on the initial position coordinate of the node, the intra-group force and the inter-group force on the node further cause the electronic device to:
determine a minimum fitting circle of each of the node groups based on the initial position coordinate of each of the nodes, respectively, to obtain a center position and a radius of each minimum fitting circle;
determine an overlapping distance between minimum fitting circles of any two node groups based on the center position and the radius of the minimum fitting circle of each of the node groups, respectively; and determine the inter-group collision repulsion force on the current node based on the overlapping distance corresponding to the current node group.

8. The device according to claim 7, wherein the computer instructions causing the electronic device to determine, based on the initial position coordinate of the node, the intra-group force on the node further cause the electronic device to:
for a current node group in the graph data, determine a first aggregation center coordinate of the current node group based on initial position coordinate of each node in the current node group; and
for a current node in the current node group, determine, based on a first distance between an initial position coordinate of the current node and the first aggregation center coordinate, the intra-group force on the current node within the current node group.

9. The device according to claim 8, wherein the inter-group force comprises an inter-group repulsion force, and the computer instructions causing the electronic device to determine, based on the initial position coordinate of the node, the intra-group force on the node further cause the electronic device to:
determine a second aggregation center coordinate of each other node group based on an initial position coordinate of each node in the other node group; and
determine the inter-group repulsion force on the current node based on a second distance between the initial position coordinate of the current node and each second aggregation center coordinate.

10. The device according to claim 7, wherein the computer instructions causing the electronic device to determine the inter-group collision repulsion force on the current node based on the overlapping distance corresponding to the current node group further cause the electronic device to:
in response to an overlapping distance between a minimum fitting circle of the current node group and a minimum fitting circle of another node group being not 0, determine the inter-group collision repulsion force between the current node group and the other node group based on the overlapping distance, and determine the inter-group collision repulsion force between the current node group and the other node group as the inter-group collision repulsion force on the current node.

11. The device according to claim 10, wherein the computer instructions causing the electronic device to determine the inter-group collision repulsion force on the current node based on the overlapping distance corresponding to the current node group further cause the electronic device to:
in response to an overlapping distance between a minimum fitting circle of the current node group and a minimum fitting circle of another node group being 0, determine that the inter-group collision repulsion force on the current node is 0.

12. The device according to claim 7, wherein the computer instructions causing the electronic device to obtain a target force-directed layout graph by adjusting the initial force-directed layout graph based on the intra-group force and the inter-group force on the node further cause the electronic device to:
determine an inter-point force on the current node;
determine a resultant force on the current node based on the inter-point force, the intra-group force, and the inter-group force on the current node; and
obtain the target force-directed layout graph by adjusting the initial position coordinate of the node based on the resultant force of the current node.

13. A non-transitory computer-readable storage medium, wherein the computer-readable storage medium stores computer instructions, and the computer instructions are configured to cause a computer to:
obtain graph data, wherein the graph data comprises a plurality of node groups, and a node group comprises at least one node;
determine an initial position coordinate of a node in the node group, and constructing an initial force-directed layout graph of the graph data;
determine, based on the initial position coordinate of the node, an intra-group force and an inter-group force on the node, wherein the intra-group force corresponds to a node group to which the node belongs, and the inter-group force corresponds to the node group to which the node belongs and another node group;
obtain a target force-directed layout graph by adjusting the initial force-directed layout graph based on the intra-group force and the inter-group force on the node; and
transmit the target force-directed layout graph to a display device for visual display,
wherein the inter-group force comprises an inter-group collision repulsion force, and the computer instructions causing the computer to determine, based on the initial position coordinate of the node, the intra-group force and the inter-group force on the node further cause the computer to:
determine a minimum fitting circle of each of the node groups based on the initial position coordinate of each of the nodes, respectively, to obtain a center position and a radius of each minimum fitting circle;
determine an overlapping distance between minimum fitting circles of any two node groups based on the center position and the radius of the minimum fitting circle of each of the node groups, respectively; and
determine the inter-group collision repulsion force on the current node based on the overlapping distance corresponding to the current node group.

14. The medium according to claim 13, wherein the computer instructions causing the computer to determine, based on the initial position coordinate of the node, the intra-group force on the node further cause the computer to:
for a current node group in the graph data, determine a first aggregation center coordinate of the current node group based on initial position coordinate of each node in the current node group; and
for a current node in the current node group, determine, based on a first distance between an initial position coordinate of the current node and the first aggregation center coordinate, the intra-group force on the current node within the current node group.

15. The medium according to claim 14, wherein the inter-group force comprises an inter-group repulsion force, and the computer instructions causing the computer to determine, based on the initial position coordinate of the node, the intra-group force on the node further cause the computer to:
determine a second aggregation center coordinate of each other node group based on an initial position coordinate of each node in the other node group; and
determine the inter-group repulsion force on the current node based on a second distance between the initial position coordinate of the current node and each second aggregation center coordinate.

16. The medium according to claim 13, wherein the computer instructions causing the computer to determine the inter-group collision repulsion force on the current node based on the overlapping distance corresponding to the current node group further cause the computer to:
   in response to an overlapping distance between a minimum fitting circle of the current node group and a minimum fitting circle of another node group being not 0, determine the inter-group collision repulsion force between the current node group and the other node group based on the overlapping distance, and determine the inter-group collision repulsion force between the current node group and the other node group as the inter-group collision repulsion force on the current node.

17. The medium according to claim 16, wherein the computer instructions causing the computer to determine the inter-group collision repulsion force on the current node based on the overlapping distance corresponding to the current node group further cause the computer to:
   in response to an overlapping distance between a minimum fitting circle of the current node group and a minimum fitting circle of another node group being 0, determine that the inter-group collision repulsion force on the current node is 0.

\* \* \* \* \*